United States Patent
Madl et al.

(10) Patent No.: US 11,587,189 B2
(45) Date of Patent: Feb. 21, 2023

(54) FORMAL VERIFICATION OF SMART CONTRACTS

(71) Applicant: International Business Machines Corporation, Armonk, NY (US)

(72) Inventors: Gabor Madl, San Jose, CA (US); Luis Angel Bathen, Placentia, CA (US); Ramani Routray, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 674 days.

(21) Appl. No.: 16/698,395

(22) Filed: Nov. 27, 2019

(65) Prior Publication Data

US 2021/0158463 A1    May 27, 2021

(51) Int. Cl.
| | |
|---|---|
| G06Q 30/00 | (2012.01) |
| G06Q 50/18 | (2012.01) |
| G06N 5/022 | (2023.01) |
| G06F 3/06 | (2006.01) |
| G06Q 20/40 | (2012.01) |

(Continued)

(52) U.S. Cl.
CPC ............. *G06Q 50/18* (2013.01); *G06F 3/061* (2013.01); *G06F 3/0673* (2013.01); *G06N 5/022* (2013.01); *G06Q 20/405* (2013.01); *G06Q 20/389* (2013.01); *H04L 9/50* (2022.05)

(58) Field of Classification Search
None
See application file for complete search history.

(56) References Cited

U.S. PATENT DOCUMENTS 6,324,286 B1 * 11/2001 Lai .................. H04L 9/0637
                                                              380/37
6,792,459 B2    9/2004 Elnozahy et al.
(Continued)

FOREIGN PATENT DOCUMENTS

| JP | 2019028525 A | * | 2/2019 | ......... G06F 16/2379 |
| JP | 2019083013 A | * | 5/2019 | ............ G06Q 20/02 |
| JP | 2020042795 A | * | 3/2020 | ............. G06F 16/28 |

OTHER PUBLICATIONS

Tianyu Feng et al. "Smart contract model for complex reality transaction." (2019). Retrieved online Aug. 31, 2022. https://ieeexplore.ieee.org/stamp/stamp.jsp?arnumber=9826658 (Year: 2019).*

(Continued)

*Primary Examiner* — James A Reagan
(74) *Attorney, Agent, or Firm* — Lieberman & Brandsdorfer, LLC

(57) ABSTRACT

Embodiments relate to a system, program product, and method for smart contract implementation and management. A request for resources is modeled and a reservation of resources is captured in a first computation model interface. A provision of services is modeled as a second computation model interface. Compatibility of the first and second computation model interfaces is verified. Input and output actions are synchronized between the first and second computation model interfaces responsive to the compatibility verification. A smart contract is composed as a third computation model interface to model negotiation of contractual terms, including the captured resources with the provision of services. The composed smart contract is recorded in an operatively coupled immutable venue.

15 Claims, 11 Drawing Sheets

(51) Int. Cl.
*G06Q 20/38* (2012.01)
*H04L 9/00* (2022.01)

(56) References Cited

U.S. PATENT DOCUMENTS

| | | | |
|---|---|---|---|
| 8,341,601 B2 | 12/2012 | Chan et al. | |
| 9,870,508 B1* | 1/2018 | Hodgson | H04N 21/2347 |
| 9,904,544 B2* | 2/2018 | Thomas | G06F 21/64 |
| 10,446,273 B1* | 10/2019 | McNair | G16H 15/00 |
| 10,483,003 B1* | 11/2019 | McNair | G16H 10/60 |
| 10,854,334 B1* | 12/2020 | McNair | G16H 50/20 |
| 10,957,449 B1* | 3/2021 | McNair | G16H 10/60 |
| 11,188,977 B2* | 11/2021 | Youb | G06Q 30/0645 |
| 11,393,024 B1* | 7/2022 | Kodihalli | G06Q 40/025 |
| 2013/0151463 A1 | 6/2013 | Ritter et al. | |
| 2014/0129444 A1 | 5/2014 | LeRoy | |
| 2015/0193583 A1* | 7/2015 | McNair | G16H 50/20 705/2 |
| 2017/0011460 A1* | 1/2017 | Molinari | G06Q 40/06 |
| 2017/0085545 A1* | 3/2017 | Lohe | G06Q 20/065 |
| 2017/0091397 A1* | 3/2017 | Shah | H04L 63/20 |
| 2017/0098291 A1* | 4/2017 | Code | G06Q 40/02 |
| 2017/0103167 A1* | 4/2017 | Shah | G06Q 10/101 |
| 2017/0124269 A1* | 5/2017 | McNair | G16H 50/20 |
| 2017/0140408 A1* | 5/2017 | Wuehler | G06Q 30/0207 |
| 2017/0155515 A1 | 6/2017 | Androulaki et al. | |
| 2017/0243286 A1* | 8/2017 | Castinado | G06Q 40/00 |
| 2017/0287090 A1* | 10/2017 | Hunn | G06Q 50/18 |
| 2017/0338957 A1* | 11/2017 | Ateniese | H04L 63/061 |
| 2017/0345019 A1* | 11/2017 | Radocchia | G06Q 10/0833 |
| 2018/0018723 A1* | 1/2018 | Nagla | H04L 63/08 |
| 2018/0068359 A1* | 3/2018 | Preston | G06Q 30/0283 |
| 2018/0101906 A1* | 4/2018 | McDonald | G06Q 20/204 |
| 2018/0109516 A1* | 4/2018 | Song | H04L 63/0823 |
| 2018/0114205 A1* | 4/2018 | Thomas | G06Q 40/02 |
| 2018/0218176 A1* | 8/2018 | Voorhees | G06Q 20/02 |
| 2018/0268506 A1* | 9/2018 | Wodetzki | G06N 5/046 |
| 2018/0315141 A1* | 11/2018 | Hunn | G06F 9/547 |
| 2018/0323980 A1* | 11/2018 | Ahn | G06F 16/183 |
| 2018/0337770 A1* | 11/2018 | Bathen | H04L 9/3239 |
| 2019/0102850 A1* | 4/2019 | Wheeler | G06Q 20/405 |
| 2019/0188399 A1* | 6/2019 | Palaniappan | H04L 9/3239 |
| 2019/0236598 A1* | 8/2019 | Padmanabhan | G06Q 20/0655 |
| 2019/0251489 A1* | 8/2019 | Berti | G06Q 10/20 |
| 2019/0317935 A1* | 10/2019 | Berti | G06F 16/27 |
| 2019/0333059 A1* | 10/2019 | Fallah | G06Q 20/308 |
| 2019/0349426 A1* | 11/2019 | Smith | H04L 63/123 |
| 2020/0007414 A1* | 1/2020 | Smith | G06Q 30/08 |
| 2020/0119906 A1* | 4/2020 | Das | H04L 9/0894 |
| 2020/0126324 A1* | 4/2020 | Hutchins | G07C 5/0858 |
| 2020/0137176 A1* | 4/2020 | Todd | H04L 9/0618 |
| 2020/0268260 A1* | 8/2020 | Tran | A61B 5/6817 |
| 2020/0287788 A1* | 9/2020 | Triplet | H04L 67/34 |
| 2020/0374127 A1* | 11/2020 | Wei-Kocsis | H04L 41/40 |
| 2021/0029216 A1* | 1/2021 | Stockert | G06Q 50/18 |
| 2021/0081404 A1* | 3/2021 | Kempf | H04L 9/3073 |
| 2021/0104326 A1* | 4/2021 | Lorenzo | G06N 20/10 |
| 2022/0108262 A1* | 4/2022 | Cella | G05B 19/41885 |

OTHER PUBLICATIONS

Chance. "Smart Contracts: Legal Framework and Proposed Guidelines for Lawmakers." (Oct. 2018). Retrieved online Aug. 31, 2022. https://www.ebrd.com/documents/legal-reform/pdf-smart-contracts-legal-framework-and-proposed-guidelines-for-lawmakers.pdf (Year: 2018).*

Shuai Wang et al. "Blockchain-Enabled Smart Contracts: Architecture, Applications, and Future Trends." (Nov. 2019). Retrieved online Aug. 31, 2022. http://sokhcn.binhduong.gov.vn/ImageUpload/file/TTTK%20KCN/2019/Nguon%20tin%20KHCN/Blockchain_A3.pdf (Year: 2019).*

Fernandez, Luz, "Smart contracts: blockchain-based contracts that don't require lawyers", Nov. 16, 2016.

De Alfaro, L., et al., "Interface Automata", pp. 109-120, ACM 2001.

* cited by examiner

FORMAL VERIFICATION OF SMART CONTRACTS

BACKGROUND

The present embodiments relate to modeling and capturing a smart contract between two parties. More specifically, the embodiments relate to leveraging an interface automata model of computation, and extending the model with properties relevant to the contract and contract characteristics. Management of the extended model is directed at automating verification of compatibility corresponding to the contractual terms and detecting violations.

SUMMARY

The embodiments include a system, computer program product, and method for smart contract implementation and management.

In one aspect, a system is provided with one or more associated tools embedded therein for smart contract implementation and management. A processing unit is operatively coupled to memory and is in communication with a knowledge engine and the embedded tools, including a resource manager, a service manager, a compatibility manager, a synchronizer, and a recordation manager. The resource manager functions to model a request for resources and capture reservation of resources in a first computation model interface. The service manager models provision of services as a second computation model interface. The compatibility manager verifies compatibility of the first and second computation model interfaces. The synchronizer synchronizes input and output actions between the first and second computation model interfaces responsive to the compatibility verification. The synchronizer further composes a smart contract as a third computation model interface to model negotiation of contractual terms, including the captured resources with the provision of services. The recordation manager records the composed smart contract in an operatively coupled immutable venue.

In another aspect, a computer program device is provided for smart contract implementation and management. The program code is executable by a processing unit to model a request for resources and capture reservation of resources in a first computation model interface. The program code models a provision of services as a second computation model interface. The program code verifies compatibility of the first and second computation model interfaces. Input and output actions are synchronized between the first and second computation model interfaces responsive to the compatibility verification. A smart contract is composed as a third computation model interface to model negotiation of contractual terms, including the captured resources with the provision of services. Program code is further provided to record the composed smart contract in an operatively coupled immutable venue.

In yet another aspect, a method is provided for smart contract implementation and management. A request for resources is modeled and a reservation of resources is captured in a first computation model interface. A provision of services is modeled as a second computation model interface. Compatibility of the first and second computation model interfaces is verified. Input and output actions are synchronized between the first and second computation model interfaces responsive to the compatibility verification. A smart contract is composed as a third computation model interface to model negotiation of contractual terms, including the captured resources with the provision of services. The composed smart contract is recorded in an operatively coupled immutable venue.

These and other features and advantages will become apparent from the following detailed description of the presently preferred embodiment(s), taken in conjunction with the accompanying drawings.

BRIEF DESCRIPTION OF THE SEVERAL VIEWS OF THE DRAWINGS

The drawings referenced herein form a part of the specification. Features shown in the drawings are meant as illustrative of only some embodiments, and not of all embodiments, unless otherwise explicitly indicated.

DETAILED DESCRIPTION

Figure 1:
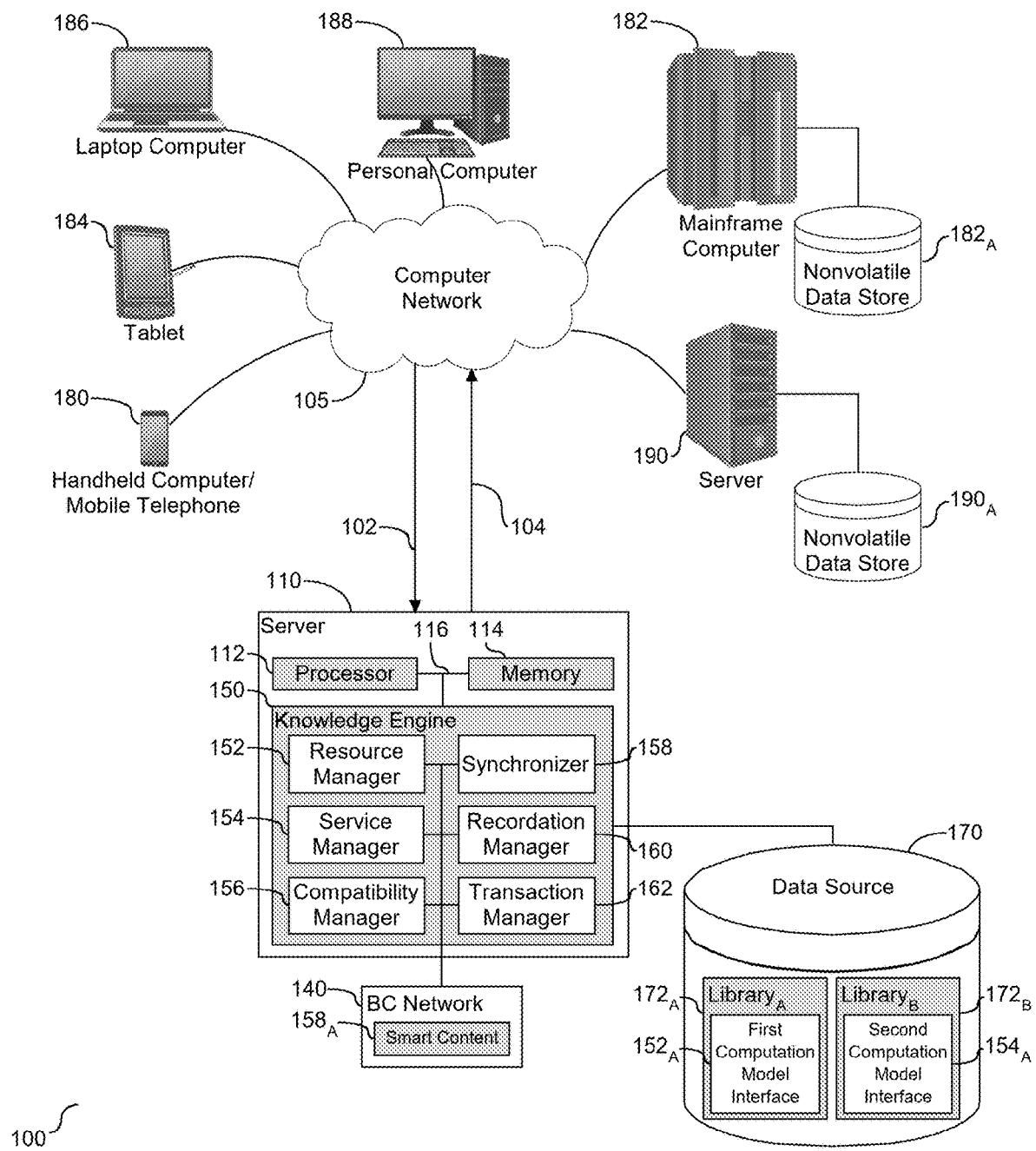
FIG. 1 depicts a system diagram illustrating a system connected in a network environment that supports knowledge resource management.

It will be readily understood that the components of the present embodiments, as generally described and illustrated in the Figures herein, may be arranged and designed in a wide variety of different configurations. Thus, the following detailed description of the embodiments of the apparatus, system, method, and computer program product of the present embodiments, as presented in the Figures, is not intended to limit the scope of the embodiments, as claimed, but is merely representative of selected embodiments.

Reference throughout this specification to "a select embodiment," "one embodiment," or "an embodiment" means that a particular feature, structure, or characteristic described in connection with the embodiment is included in at least one embodiment. Thus, appearances of the phrases "a select embodiment," "in one embodiment," or "in an embodiment" in various places throughout this specification are not necessarily referring to the same embodiment.

The illustrated embodiments will be best understood by reference to the drawings, wherein like parts are designated by like numerals throughout. The following description is intended only by way of example, and simply illustrates certain selected embodiments of devices, systems, and processes that are consistent with the embodiments as claimed herein.

A smart contract is a computer program that directly controls transaction execution. Smart contracts are self-executing agreements between two or more parties. Contract terms between the parties are reflected in corresponding program code. In one embodiment, the smart contract is a self-enforcing agreement embedded in computer code managed by a blockchain. The code contains a set of rules under which the parties of the smart contract agree to interact. Underlying values and access rights are stored in the blockchain, which is a transparent, shared ledger, where the contract rules and terms are protected from deletion, tampering, and revision. The smart contract by definition may be precise, unambiguous, and provide an automated venue to facilitate, enforce, and verify underlying contractual clauses.

A service level agreement (SLA) is a service contract between a service provider and a customer. The SLA provides specific and measureable aspects related to service offerings. More specifically, the SLA defines the terms by which service providers and end users must abide. SLAs are typically written in legal terms, e.g. legalese, which in one embodiment may make the limitations of the agreement difficult to understand. A formal and detailed approach is described herein to unambiguously capture smart contracts and the terms therein. For descriptive purposes, the smart contract is described herein as an SLA, although this category of the smart contract should not be considered limiting, and in one embodiment may be expanded to include various forms of service contracts. By formally modeling the SLA, contract requirements and services are formally verified for compatibility. Accordingly, the composition of the smart contract captures key aspects of the SLA in a clear and unambiguous format, where violations between the smart contract and actual implementation can be detected and enforced by either party of the agreement.

Automata pertain to logic of computation with respect to simple machines. Automatons are abstract models of machines that perform computations on an input by moving through a series of states of configurations. At each state of the computation, a transition function determines the next configuration on the basis of a finite portion of the present configuration. Once the computation reaches an accepting configuration, it accepts that as input. As shown and described herein, an interface automaton is used for formal specification of the smart contract. The interface automaton builds on a finite state machine model of computation to capture the states of communication, as well as relationships between input, output, and internal actions. The use of the interface automaton herein is extended to capture end user requirements and services provided by the service provider. The extended interface automaton is referred to herein as an SLA interface automaton. An interface automaton employs a tuple, P, consisting of $V_P$, $V_P^{init}$, $A_P^I$, $A_P^O$, $A_P^H$, and $T_P$. $V_P$ is a set of states. $V_P^{init}$ is a set of initial states and is required to contact at most one state. If $V_P=0$, then the tuple P is empty. $A_P^I$, $A_P^O$, and $A_P^H$ are mutually disjoint sets of input, output, and internal actions, respectively. The set of all actions, $A_P$, is defined as a union of $A_P^I$, $A_P^O$, and $A_P^H$, e.g. $A_P = A_P^I \cup A_P^O \cup A_P^H$.

The SLA interface automaton, S, is an extension of the interface automaton, P. As shown and described herein, the SLA interface automaton is defined by a set of states, $V_S$, with labeling function, including capacity, storage type, tier, input-output operation rate (IOPS), data states, duration, uptime, price_in, and price_out. The capacity state, referred to herein as capacity($V_S$), assigns a natural number specifying the storage capacity, which in one embodiment is defined in gigabytes (GB). The storage type state, referred to herein as storage_type($V_S$), assigns a label to the capacity state specifying the storage type used. The tier state, referred to herein as tier($V_S$), assigns a natural number specifying the storage tier. In one embodiment, multiple storage tiers may be the subject of the agreement, with different tiers having associated storage availability, capacity, and costs. The TOPS state, referred to herein as IOPS($V_S$), assigns a real number specifying the number of input/output operations per time period per storage capacity, e.g. input/output operations per second per GB. The data storage, referred to herein as data_state($V_S$), assigns a label specifying a storage optimization state of the data stored. The duration state, referred to herein as duration($V_S$), assigns a natural number specifying the duration of the requested service per unit of time, e.g. hours. The uptime state, referred to herein as uptime ($V_S$), assigns a real number in the range of [1,100] expressing the uptime as a percentage. The price_in state, referred to herein as price_in($V_S$, capacity), assigns a non-negative real number specifying the cost of writing incoming data for a given total capacity of data. The price+out state, referred to herein as price_out($V_S$, capacity), assigns a non-negative real number specifying the cost of reading outgoing data per storage capacity unit, e.g. GB.

As shown and described herein, input and output actions between two automata are synchronized to compose an SLA interface automata modeling service requirements and services provided. There are three primary aspects for the synchronization, including model checking, theorem proving, and abstract interpretation. Model checking is directed at how interface automata capture agreements and explore all possible states to verify whether two interface automata are compatible. Theorem proving is directed at utilizing mathematical formulas and definitions to capture the terms of the agreement, e.g. SLA, and verification of the terms. Abstract interpretation is directed at a static analysis to prove properties using a simplified abstract model that captures the abstract semantics of the system under consideration. Accordingly, by formally capturing an agreement in an unambiguous matter, it becomes possible to check whether the smart contract is valid, whether the terms of the agreement are violated, and ascertain a party responsible for any determined violations.

Referring to FIG. 1, a schematic diagram of a computer system (100) to support knowledge resource management is depicted. As shown, a server (110) is provided in communication with a plurality of computing devices (180), (182), (184), (186), (188), and (190) across a network connection (105). The server (110) is configured with a processing unit (112) in communication with memory (116) across a bus (114). The server (110) is shown with a knowledge engine (150) with embedded tools to model an agreement as a smart contract. The server (110) and the tools therein are in communication and accessible over the network (105) from one or more of the computing devices (180), (182), (184), (186), (188), and (190). The server (110) is shown herein operatively coupled to a knowledge base (160). Each of the computing devices (180), (182), (184), (186), (188), and (190) communicate with each other and with other devices or components via one or more wired and/or wireless data communication links, where each communication link may comprise one or more of wires, routers, switches, transmitters, receivers, or the like. In addition, each of the computing devices (180)-(190) is operatively coupled to the data source (170) across the network (105). Other embodiments of the server (110) may be used with components, systems, subsystems, and/or devices other than those that are depicted herein.

The knowledge engine (150) is shown herein configured with tools to capture smart contracts, including categories, requirements, and constraints, and a level of service required and provided in each category. More specifically, the tools utilize interface automata to formally model the smart contract, verify compatibility of the categories, and detect contract violations. The tools include a resource manager (152), a service manager (154), a compatibility manager (156), a synchronizer (158), a recordation manager (160), and a transaction manager (162). The resource manager (152) functions to model a request for resources as a first computation model interface ($152_A$), also referred to herein as first automaton. Although the first computation model interface ($152_A$) is shown stored in the data source (170), in one embodiment, the computation model interface ($152_A$) may be operatively coupled to the resource manager (152). The resource manager (152) captures reservations of one or more sources in the first computation model interface. In one embodiment, the first computation model interface is referred to as a first automaton. A process for capturing reservations of the one or more sources is shown and described in FIG. 4. The service manager (154) functions to model provision of services as a second computation interface ($154_A$), also referred to herein as a second automaton, shown stored in the data source (170), although in one embodiment may be operatively coupled to the service manager (154). In one embodiment, the second computation model interface is referred to as a second automaton. A process for capturing provision of services is shown and described in FIG. 5.

For descriptive purposes the smart contract is described herein as a service level agreement (SLA), although other forms of contracts may be supported with the tools shown and described herein. With respect to the SLA, the first automaton ($152_A$) models and captures service provider resources reserved by a user, and the second automaton ($154_A$) models and captures services provided by a service provider. The compatibility manager (156), shown herein operatively coupled to both the resource manager (152) and the service manager (154), functions to verify compatibility of the first and second computation model interfaces ($152_A$) and ($154_A$), respectively. The synchronizer (158), which is shown herein operatively coupled to the compatibility manager (156), functions to synchronize input and output actions between the first and second computation model interfaces, ($152_A$) and ($154_A$), respectively, in response to compatibility verification. More specifically, the synchronizer (158) composes a smart contract ($158_A$) as a third computation model interface to model negotiation of contractual terms, which includes the captured resources with the provision of services. Although shown operatively coupled to an immutable venue (140), shown herein as a Blockchain (BC) Network (140), the smart contract may be operatively coupled to the synchronizer (158). The recordation manager (160) functions to record or otherwise formalize the smart contract ($158_A$) in the immutable venue (140), shown herein operatively coupled to the knowledge engine (150). Accordingly, the tools support the composition of end user requirements and service interface results in a smart contract that captures key aspects of the SLA in a clear and unambiguous format.

It is understood that the SLA agreement is employed to document and enforce service parameters for a user. The transaction manager (162) functions to present one or more transactions to the third computation model interface ($158_A$), e.g. third automaton, and to leverage the immutable venue (140) to process the transaction, as shown and described in FIG. 7. In one embodiment, the immutable venue is the Blockchain (BC) that leverages corresponding BC ledger entries with each entry having a BC identifier. The transaction manager (162) uses the immutable venue (140) to perform one or more of the following actions with respect to a transaction: validate, monitor, or detect violation. In the case of detection of a violation, the transaction manager (162) leverages the immutable venue (140) to identify the party violating the presented transaction.

As shown and described herein, the smart contract may be in the form of an SLA between a service provider and a user of the services. In one embodiment, the services include storage of data. It is understood in the art that data may be stored in a tier data storage system and subject to migration among the tiers, or in one embodiment to secondary or remote data storage. Data migration is a process of transferring data between data storage systems, data formats, or computer systems. One form of data migration is directed at storage migration, which involves moving blocks of storage and files from one storage system to another. In one embodiment, data may be subject to storage migration based on age or access of the data, with older or less frequently accessed data subject to migration to a remote or cloud based storage. The transaction manager (162) functions to manage data migration according to the services modeled in the third computation model interface ($158_A$).

Each of the computation model interfaces, e.g. ($152_A$), ($154_A$), and ($158_A$), have formal semantics that are configured to be translated to an unambiguous mathematical representation. A manifestation of the computation of the model interfaces with formal semantics may be in the form of an automaton, a finite state machine, a petri-net, data flow, and/or message sequence charts. For descriptive purposes, the model interfaces are described as interface automaton, which build on the finite state machine model of computation to capture state of communication, as well as relationships between input, output, and internal actions.

As shown, the data source (170) is operatively coupled to the knowledge engine (150) and is configured with a library of model interfaces. In the example shown herein, the data source (170) is shown with two libraries, including library$_A$ ($172_A$) and library$_B$ (172B). Although only two libraries are shown herein, the quantity should not be considered limiting. In one embodiment, and as shown herein, library$_A$ ($172_A$) is populated with the first interface automaton ($152_A$) and library$_B$ ($172_B$) is populated with the second interface automaton ($154_A$). Although each library is shown populated with a single automata interface, this quantity should not be considered limiting, and in one embodiment, each library may be populated with a plurality of automata interfaces. Accordingly, the quantity of automata interfaces in each library is for descriptive purposes and should not be considered limiting.

The various computing devices (180), (182), (184), (186), (188), and (190) in communication with the network (105) may include access points to the knowledge base (170) and the corresponding libraries. The network (105) may include local network connections and remote connections in various embodiments, such that the knowledge engine (150) may operate in environments of any size, including local and global, e.g. the Internet. The knowledge engine (150) serves as a front-end system that can make available a variety of knowledge extracted from or represented in the respective automata interfaces.

In some illustrative embodiments, server (110) may be the IBM Watson® system available from International Business Machines Corporation of Armonk, N.Y., which is augmented with the mechanisms of the illustrative embodiments described hereafter. The IBM Watson® system may support the tools (152)-(162) to support knowledge resource management, including agreement modeling and management as described herein. The tools (152)-(162), also referred to herein as knowledge engine tools, are shown as being embodied in or integrated within the knowledge engine (150) of the server (110). The tools may be implemented in a separate computing system (e.g., 190) that is connected across network (105) to the server (110). Wherever embodied, the tools function to support and enable modeling an agreement as a smart contract, and management of the contract and the terms represented therein.

Types of information handling systems that can utilize the knowledge engine platform (150) range from small handheld devices, such as handheld computer/mobile telephone (180) to large mainframe systems, such as mainframe computer (182). Examples of handheld computer (180) include personal digital assistants (PDAs), personal entertainment devices, such as MP4 players, portable televisions, and compact disc players. Other examples of information handling systems include a pen or tablet computer (184), a laptop or notebook computer (186), a personal computer system (188), and a server (190). As shown, the various information handling systems can be networked together using computer network (105). Types of computer network (105) that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems may use separate nonvolatile data stores (e.g., server (190) utilizes nonvolatile data store ($190_A$), and mainframe computer (182) utilizes nonvolatile data store ($182_A$)). The nonvolatile data store ($182_A$) can be a component that is external to the various information handling systems or can be internal to one of the information handling systems.

The information handling system employed to support the knowledge engine (150) may take many forms, some of which are shown in FIG. 1. For example, AI platform may take the form of a desktop, server, portable, laptop, notebook, or other form factor computer or data processing system. In addition, the information handling system to support the knowledge engine (150) may take other form factors such as a personal digital assistant (PDA), a gaming device, ATM machine, a portable telephone device, a communication device or other devices that include a processor and memory.

Figure 2:
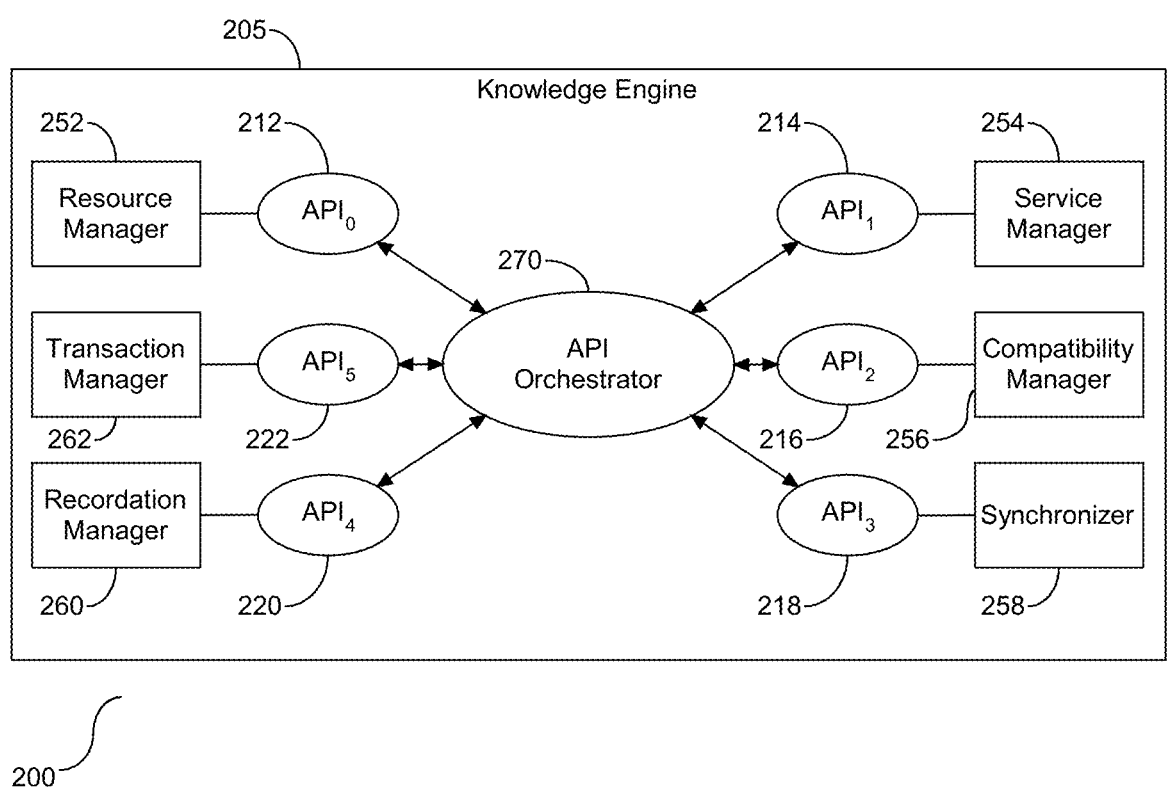
FIG. 2 depicts a block diagram illustrating the AI platform tools, as shown and described in FIG. 1, and their associated application program interfaces.

An Application Program Interface (API) is understood in the art as a software intermediary between two or more applications. With respect to the knowledge engine (150) shown and described in FIG. 1, one or more APIs may be utilized to support one or more of the tools (152)-(162) and their associated functionality. Referring to FIG. 2, a block diagram (200) is provided illustrating the tools (152)-(162) and their associated APIs. As shown, a plurality of tools are embedded within the knowledge engine (205), with the tools including the resource manager (252) associated with $API_0$ (212), the service manager (254) associated with $API_1$ (214), the compatibility manager (256) associated with $API_2$ (216), the synchronizer (258) associated with $API_3$ (218), the recordation manager (260) associated with $API_4$ (220), and the transaction manager (262) associated with $API_5$ (222). Each of the APIs may be implemented in one or more languages and interface specifications.

$API_0$ (212) provides functional support to model a request for resources as a first computation model interface; $API_1$ (214) provides functional support to model provision of services as a second computation model interface; $API_2$ (216) provides functional support to verify compatibility of the first and second computation model interfaces; $API_3$ (218) provides functional support to synchronize input and output actions between the first and second computation model interfaces in response to the compatibility verification, and to compose a smart contract as a third computation model interface; $API_4$ (220) provides functional support to record the smart contract in an immutable venue; and $API_5$ (222) provides functional support for transaction processing in compliance with the smart contract and via the immutable venue. As shown, each of the APIs (212), (214), (216), (218), (220), and (222) are operatively coupled to an API orchestrator (270), otherwise known as an orchestration layer, which is understood in the art to function as an abstraction layer to transparently thread together the separate APIs. In one embodiment, the functionality of the separate APIs may be joined or combined. As such, the configuration of the APIs shown herein should not be considered limiting. Accordingly, as shown herein, the functionality of the tools may be embodied or supported by their respective APIs.

Figure 3:
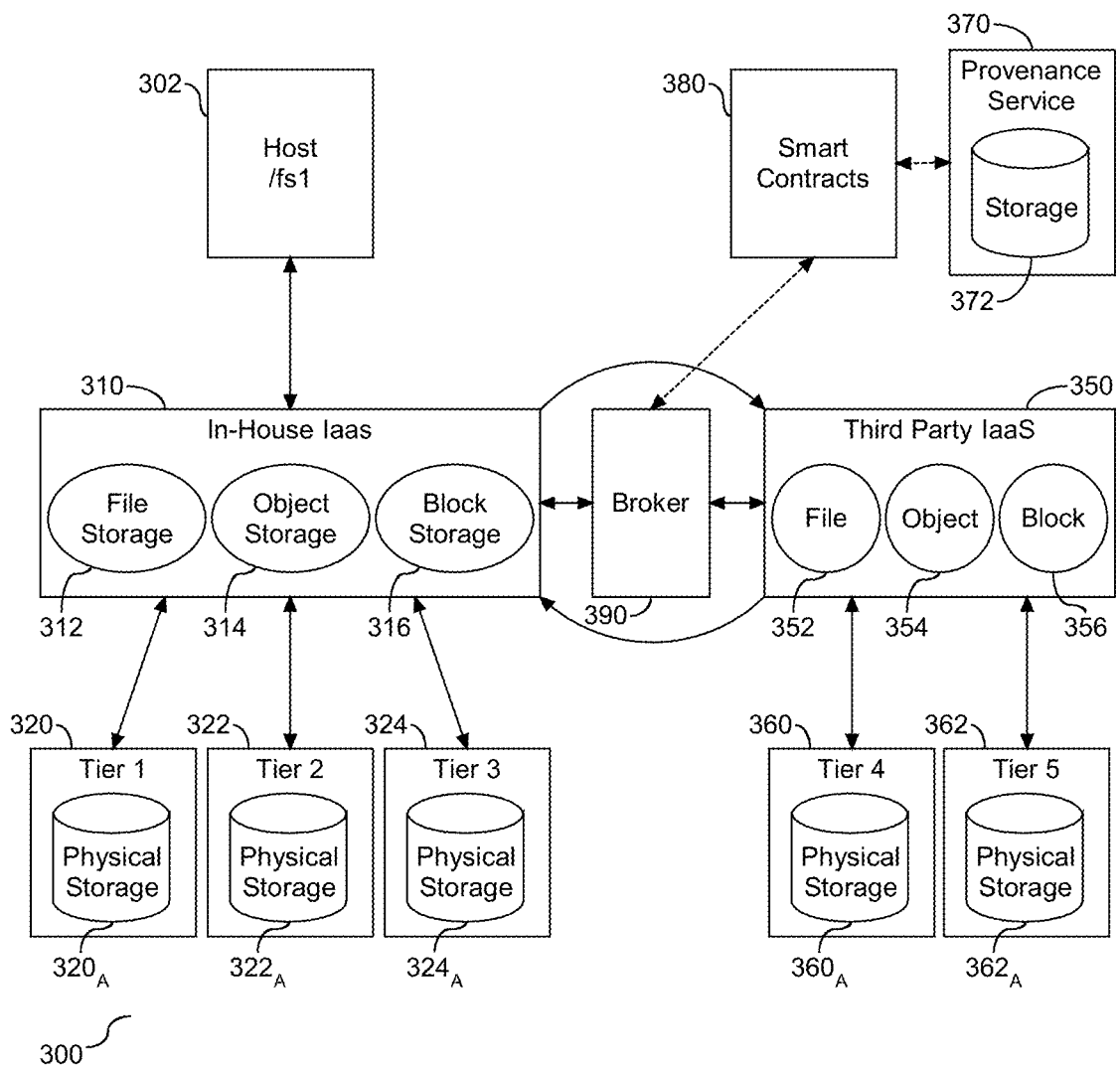
FIG. 3 depicts a block diagram illustrating a hybrid storage environment that integrates a third party storage solution.

Referring to FIG. 3, a block diagram (300) is provided to illustrate a hybrid storage environment that integrates a third party storage solution. In the example shown herein, the third party storage solution is an IaaS storage solution, although this embodiment should not be considered limiting. As shown, a host (302) accesses a storage service provider (310) for data storage. The service provider (310) is shown supporting file storage (312), object storage (314), and block storage (316), which in one embodiment may be a combination of two or more of the storage types. The storage service provider (310) may utilize multiple tiers of persistent storage to optimize storage costs and performance. In the example shown herein, the tiers include $tier_1$ storage (320), $tier_2$ storage (322), and $tier_3$ storage (324). Each tier is shown with respective physical storage. $Tier_1$ (320) is shown with physical $storage_1$ ($320_A$), $tier_2$ (322) is shown with physical $storage_2$ ($322_A$), and $tier_3$ (324) is shown with physical $storage_3$ ($324_A$). In one embodiment, I/O density specifies the number of I/O operations per second per gigabyte of storage, and is a key metric for the hierarchical arrangement reflected and associated with multiple tiers. Data that is accessed often is considered "hot" data, and is allocated to lower tiers for faster access, which in one embodiment is a more expensive form of data storage. Conversely, data that is accessed less frequently, or in one embodiment rarely, is referred to as "cold" data, and is allocated to higher tiers for slower access, which in one embodiment is a less expensive form of storage.

Storing data on a remote server accessed across a network connection, also referred to as cloud storage, may be less expensive in comparison to local data storage. When dealing with archived data, the cost of storage may become a dominant or critical factor. Referring to FIG. 3, third party storage is integrated with the IaaS solution to mitigate the costs of storage. In one embodiment, data that is rarely used may be archived to take advantage of cost savings. As shown herein, the third party storage provider (350) is shown supporting file storage (352), object storage (354), and block storage (356), which in one embodiment may be a combination of two or more of the storage types. The third party storage provider (350) may utilize multiple tiers of persistent storage to optimize storage costs and performance. The third party storage (350) is shown with physical storage tiers, including tier$_4$ (360) shown with physical storage$_4$ (360$_A$) and tier$_5$ (362) shown with physical storage$_5$ (362$_A$). Tier$_4$ storage (360$_A$) and tier$_5$ storage (362$_A$) serve as storage tiers for cold data that is designated to be archived.

Migration of data to and from third party storage should be managed seamlessly. Service level agreements (SLAs) are commonly employed between the storage service provider (310) and the third party storage (350) to specify the services provided, as well as the quality of service properties. As shown and described in FIGS. 1 and 4-8 and as demonstrated in FIG. 3, SLAs can be captured as smart contracts (380), and stored persistently in a provenance service (370), shown herein with physical storage (372). Details of the provenance service (370) and immutable characteristics are shown and described in detail in FIG. 8. As shown herein, a broker agent (390) is employed to manage migration of data, as needed, according to the SLA stored in the smart contract. In one embodiment, the broker agent (390) functions to interface the terms of the smart contract between the parties to ensure that data migration terms in the SLA are supported. Accordingly, the smart contract is a manifestation of the SLA stored in a provenance service to maintain immutable characteristics and functionality.

Figure 4:
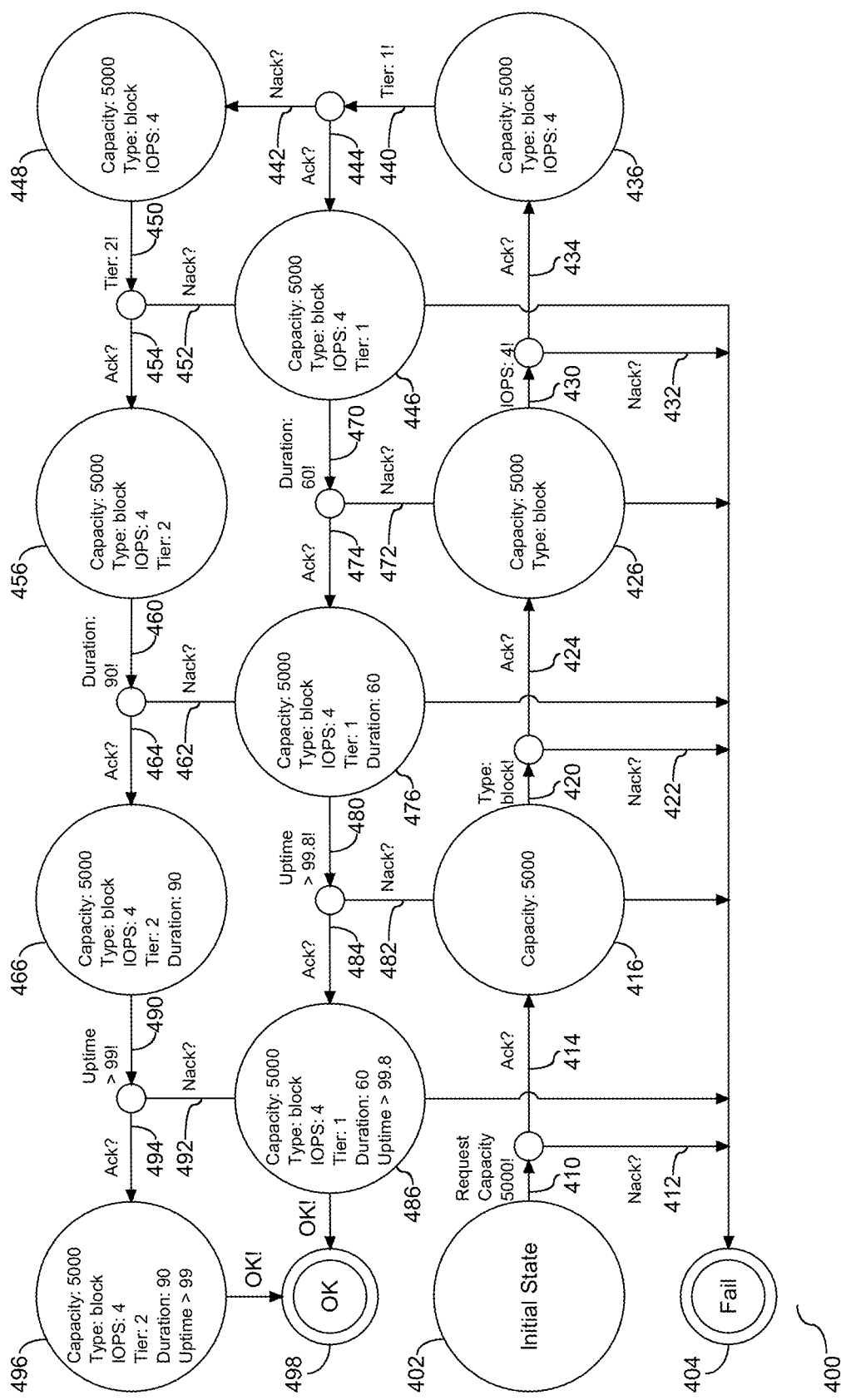
FIG. 4 depicts a flow diagram illustrating a process for an IaaS user request for resources modeled as an SLA interface automaton.

Referring to FIG. 4, a flow diagram (400) is provided to illustrate a process for an IaaS user request for resources modeled as an SLA interface automaton. In one embodiment, the modeling shown and described in FIG. 4 is referred to as a user request automaton. As shown and described herein, the automaton has two input actions, including Ack and Nack, no internal actions, and seven output actions, shown herein as Capacity, Type, IOPS, Tier, Duration, Uptime and OK. The process captures negotiation through which IaaS resources are reserved by the corresponding user. The negotiated properties shown in this example include: capacity($V_S$), storage_type($V_S$), tier($V_S$), duration($V_S$), and uptime($V_S$). An initial state is shown at (402). The process begins by requesting a quantity of storage capacity (410). In the example shown herein, the request is for 5000 GB. The automaton waits for a response from the service provider, which provides a response in the form of one of the two input actions. As shown herein, if the service provider returns a Nack input action (412), the request breaks down, and the automaton ends in the Fail state (404), and if the service provided returns an Ack input action (414), the automaton enters the next state, shown herein labeled with storage capacity, e.g., Capacity, with the requested storage capacity value (416). In the example shown herein, it is demonstrated that the Capacity of 5000 GB is the agreed property value. Accordingly, the label on the Capacity state (416) indicates properties that have been agreed upon by both the service provider as well as the user.

As shown herein, e.g. by the direction of the arrows, after the capacity state has been agreed upon, the requested storage type is block storage (420). If the service provides returns a Nack input action (422), the request breaks down, and the automaton ends in the Fail state (404), and if the service provider returns an Ack input action (424), the automaton enters the next state, shown herein labeled with block storage type (426). Attaining the next state at (426) is a demonstration of the agreed value. After the storage type state, the next negotiated value is shown herein as operation speed (430). In this example, the requested speed is 4 I/O operations per second per GB performance. If the service provider returns a Nack input action (432), the request breaks down, and the automaton ends in the Fail state (404), and if the service provider returns an Ack input action (434), the automaton enters the next state, shown herein labeled with the requested speed (436). Accordingly, at the current state, (436), is a demonstration that capacity, storage type, and speed have all been negotiated and agreed upon by both parties.

Following the state shown at (436), the next value to be negotiated is shown herein as the storage tier type (440). It is understood in the art that there are various different classes of storage devices, each having different characteristics. A tiered stage is known as a data storage method or system having two or more storage types. Each tier involves attribute differences, such as price, performance, capacity, and functions. Tiered storage requirements are determined by functional differences, such as need for replication, security, speed, etc. In the example shown herein, the storage type requested to be supported by the service provider is Tier$_1$ storage. It is understood in the art that Tier$_1$ storage is refers to high performance persistent storage devices that in one embodiment are utilized to store critical or frequently accessed data, such as transactional data. In one embodiment, other types of storage tiers include Tier$_0$ and Tier$_2$. In the example show herein, the storage capacity types available are Tier$_1$ and Tier$_2$. As shown at (440), the requested storage type is Tier$_1$. An acceptance (444) of the request by the service provider is demonstrated by entering the state shown at (446), shown herein labeled with the requested storage type. However, non-acceptance (442) of the request is demonstrated herein by maintaining the state prior to the request, shown at (448). Accordingly, the state corresponding to the storage tier request shows a branch in the request flow space.

As shown herein, if the service provider is not able to reserve the agreed capacity of Tier 1 storage, the service providers sends a non-acceptance communication (442), and is followed by a request for Tier$_2$ storage (450). An acceptance (454) of the request by the service provider is demonstrated by entering the state shown at (456), shown herein labeled with the requested storage type. In the example shown herein, there are two storage tiers available, Tier$_1$ and Tier$_2$. Non-acceptance (452) of the Tier$_2$ storage capacity request is demonstrated herein by the state shown at (446) with the Tier$_1$ storage.

Following the reservation of the storage capacity, the flow proceeds to demonstrate negotiation of the request duration. If Tier$_1$ storage has been ascertained, as shown herein at (446), the duration request is shown herein as 60 hours of service (470), and if Tier$_2$ storage has been ascertained, as shown herein at (456), the duration request is shown herein as 90 hours of service (460). Non-acceptance of the 60 hours of service (472) by the service provider is shown herein by a return to the state shown at (426), and acceptance of the 60 hours of service (474) by the service provider is shown by entering the state shown at (476). Similarly, non-acceptance of the 90 hours of service (462) by the service provider is shown herein by entering the state shown at (476), and acceptance of the 90 hours of service (464) by the service provider is shown by entered the state shown at (466).

After the request duration negotiation, the uptime is requested and negotiated. Uptime is the amount of time that a service is online available and operational. It is understood that guaranteed uptime is a term expressed in the SLA, and in one embodiment is considered a critical metric to measure the quality of a hosting provider. For example, an uptime of 99.99% equates to 52 minutes and 46 seconds of downtime annually. As shown herein, following the state shown at (476), the requested uptime value is shown as greater than 99.8% (480). Non-acceptance of this uptime request (482) by the service provider is shown by reverting to the state shown at (416), and acceptance of this uptime request (484) by the service provider is shown by entering the state shown at (486). Similarly, following the state shown at (466), the requested uptime value is shown as greater than 99% (490). Non-acceptance of this uptime request (492) by the service provider is shown by entered the state shown at (486), and acceptance of this uptime request (494) is shown by entering the state shown at (496). Following attainment of the states show at (486) or (496), successful negotiation of the services is documented with the automaton ending in the state shown at (498). Accordingly, the flow diagram shown herein demonstrates formal modeling of end an SLA interface automaton.

As shown in FIG. 4, the interface automaton attains various states through acceptance or rejection actions. The label on each state indicates properties that have been agreed upon by both the service provider as well as the user. The formal model also provides verifiability; it captures all input/output actions from and to the SLA interface automata modeling end user storages requirements. Accordingly, the parties of the SLA can provide all steps taken and the negotiated terms of the agreement.

Figure 5:
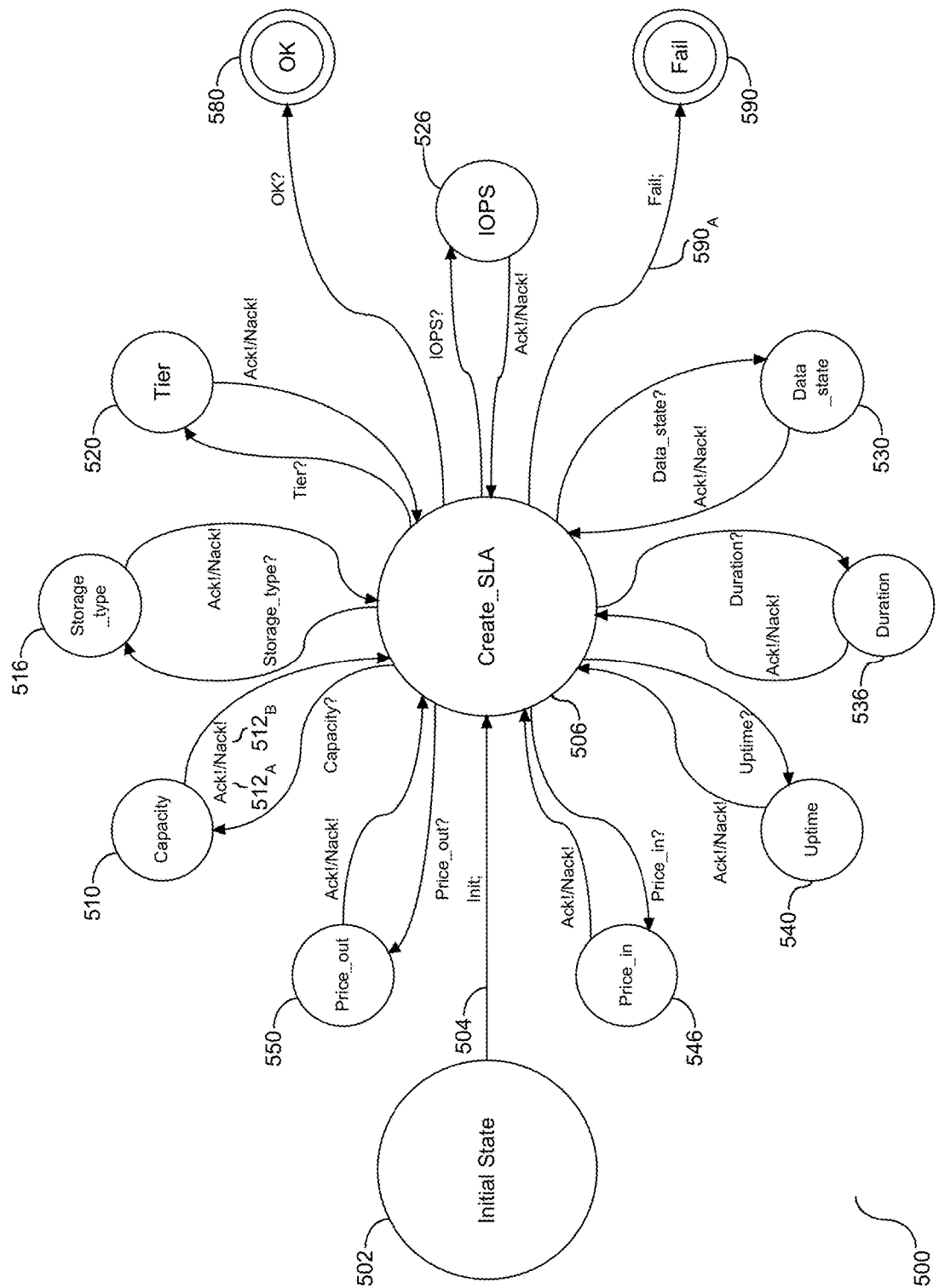
FIG. 5 depicts a block diagram illustrating formal modeling of services provided.

Referring to FIG. 5, a block diagram (500) is provided to illustrate formal modeling of services provided. More specifically, the diagram (500) shows the SLA interface automaton model for the service provider. As shown herein, the automaton has a plurality of input actions, including: capacity (510), storage_type (516), tier (520), operation speed (526), data state (530), duration (536), and uptime (540), price_in (546), and price_out (550). Each input action is comprised of two internal actions, shown herein as Init and Fail, and two output actions, shown herein as Ack and Nack, having similar functionality to that shown and described in FIG. 4. The automaton transitions from an initial state (502) to the Create_SLA state (506) as demonstrated at (504). While in the Create_SLA state (506), the automaton is ready to respond to any of the input actions shown and described herein. For example, if the automaton receives a Capacity input action, the automaton enters the capacity state (510). In this state, the service provider checks availability of a requested storage and either responds positively, modeled as the Ack output action ($512_A$), or negatively, modeled as the Nack output action ($512_B$).

When the SLA automaton modeling the request receives a Nack action for capacity it transitions to the Create_SLA state (506). While the automaton representing the request transitions into the Fail state shown at (404) immediately, the automaton representing the service provider enters the Create_SLA state (506). The Fail state (590) is reachable from the Create_SLA state (506) though the Fail internal action ($590_A$). Internal actions in the interface automata are interleaved asynchronously with input and output actions. Compatibility between two interface automata is evaluated. For example, the transition from the Capacity state (416) to the Fail state (404) in the user request automata shown in FIG. 4 is compatible with the two-step transition from the Capacity state (510) to the Create_SLA state (506) and then the Fail state (590) in the service provider automaton shown in FIG. 5.

Figure 6:
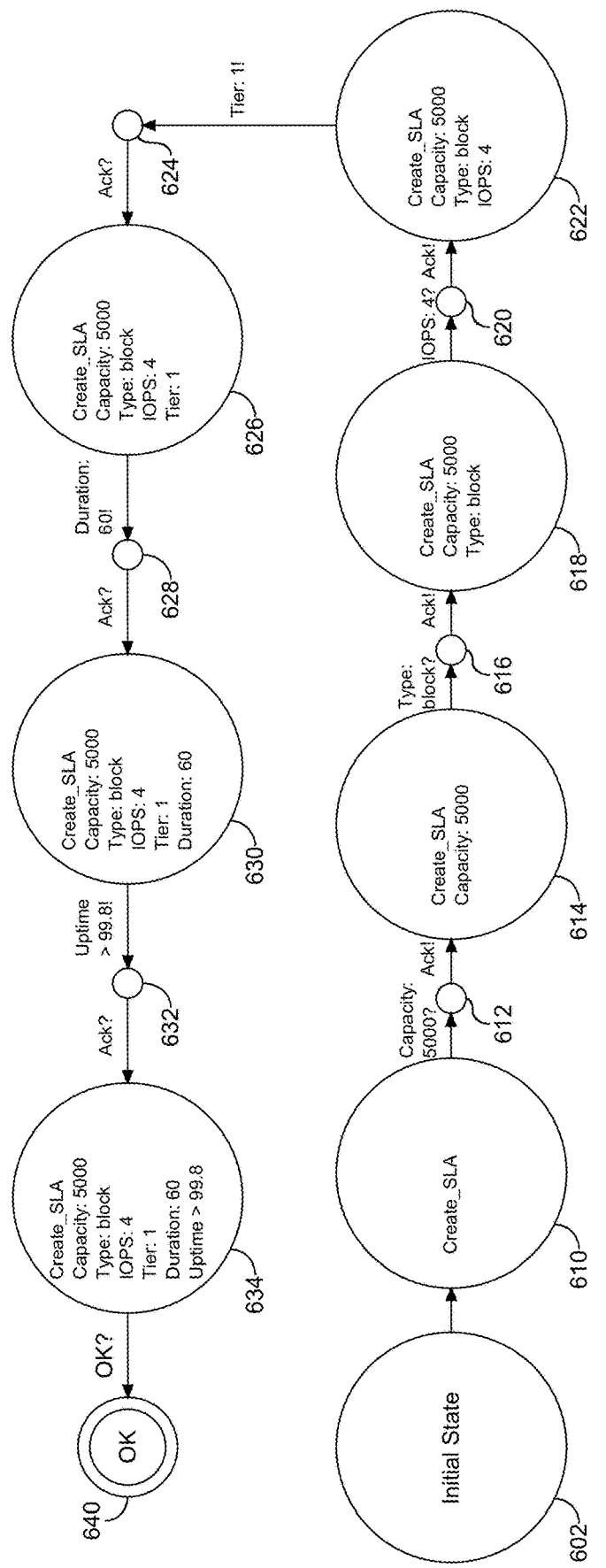
FIG. 6 depicts a flow diagram illustrating a smart contract modeled as an automaton demonstrating contract terms agreed to by the service provider.

Referring to FIG. 6, a flow diagram (600) is provided to illustrate a smart contract modeled as an automaton demonstrating contract terms agreed to by the service provider. The first step of creating a smart contract is to verify compatibility of the service provider storage requirements with the service provider services. As shown, following the initial state (602), an SLA is created (610) to capture the services to be provided by the service provider. The first step shown at (612) is to verify the compatibility of the service provided storage requirements, shown and described in FIG. 4, with the service provider services, shown and described in FIG. 4. Acceptance of the capacity compatibility (614) is captured and proceeds to verifying compatibility of storage type (616). Similarly, acceptance of the storage type compatibility (618) is captured and proceeds to verifying compatibility of operation speed (620). Acceptance of the operation speed (622) is captured and proceeds to verifying compatibility of the storage type, e.g. storage tier, (624). The process continues with acceptance of the storage type (626), verification and acceptance of the duration (628) and (630), respectively, and verification and acceptance of the uptime (632) and (634), respectively. Successful verification of the provider agreement to the contract terms and associated services is documented with the automaton ending in the state shown at (640). Accordingly, the flow diagram shown herein demonstrates verification of the terms of the service provider in the smart contract.

Figure 7:
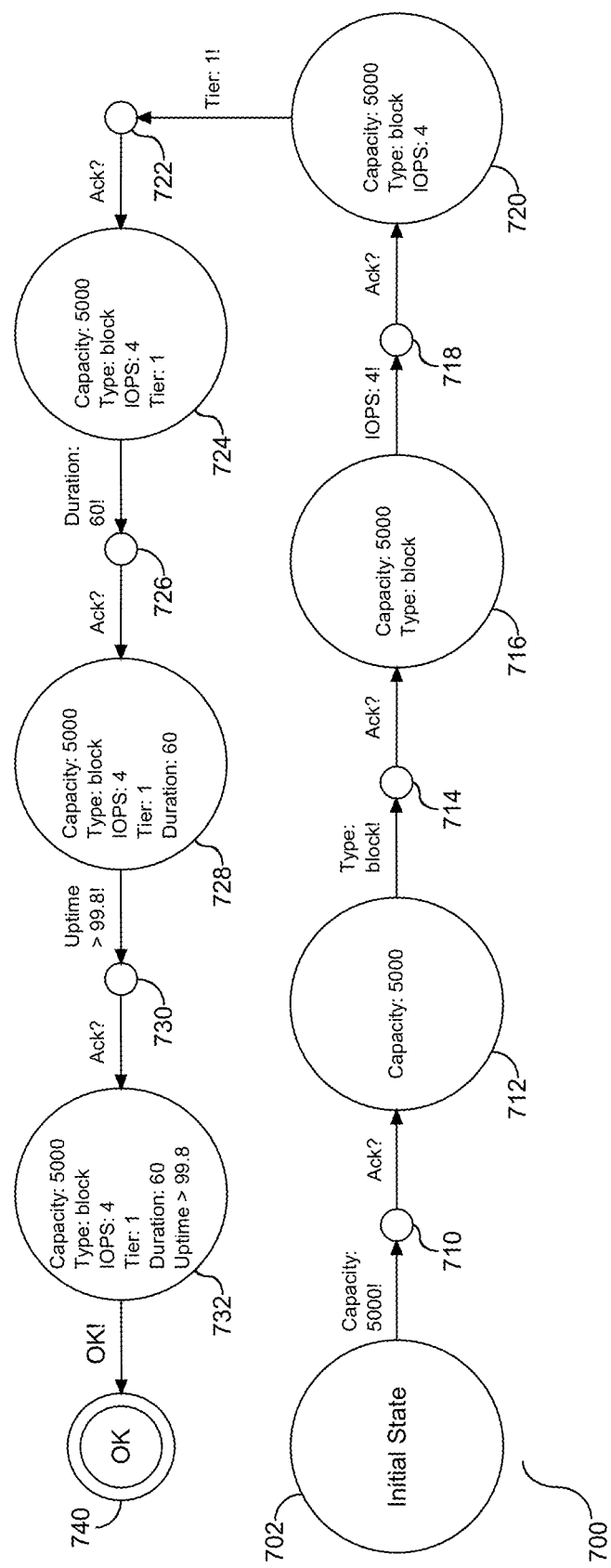
FIG. 7 depicts a flow diagram illustrating an automaton demonstrating compatibility verification of the smart contract terms agreed to by the user.

Referring to FIG. 7, a flow diagram (700) is provided to illustrate an automaton demonstrating compatibility verification of the smart contract terms agreed to by the user. As shown, following the initial state (702), the storage requirements, e.g. storage capacity, are subject to compatibility verification (710) with acceptance of the capacity compatibility captured at (712). Following capacity terms acceptance (712), verification proceeds to assessment of compatibility of storage type (714). Acceptance of the storage type compatibility (716) is captured and proceeds to verifying compatibility of operation speed (718). Acceptance of the operation speed (720) is captured and proceeds to verifying compatibility and acceptance of the storage type, e.g. storage tier, (722) and (724), respectively, duration (726) and (728), respectively, and uptime (730) and (732), respectively. Successful compatibility verification and assessment of the user's agreement to the contract terms and associated services is documented with the automaton ending in the state shown at (740). Accordingly, the flow diagram shown herein demonstrates compatibility verification of the terms of the smart contract.

As shown and described in FIGS. 6 and 7, both the service provider requirements and the services provider services provided are captured formally as SLA interface automata. Two automata are considered compatible if there exist a series of steps in both automata such that the input and output actions are synchronized. Synchronization of input and output actions between two automata lead to the composition of an SLA interface automata modeling both the service requirements and the services provided, and is referred to here as a smart contract. More specifically, the smart contract precisely and unambiguously specifies the SLA between the two parties, e.g. the service provider and the user. Violation of the smart contract by either party can be identified.

Figure 8:
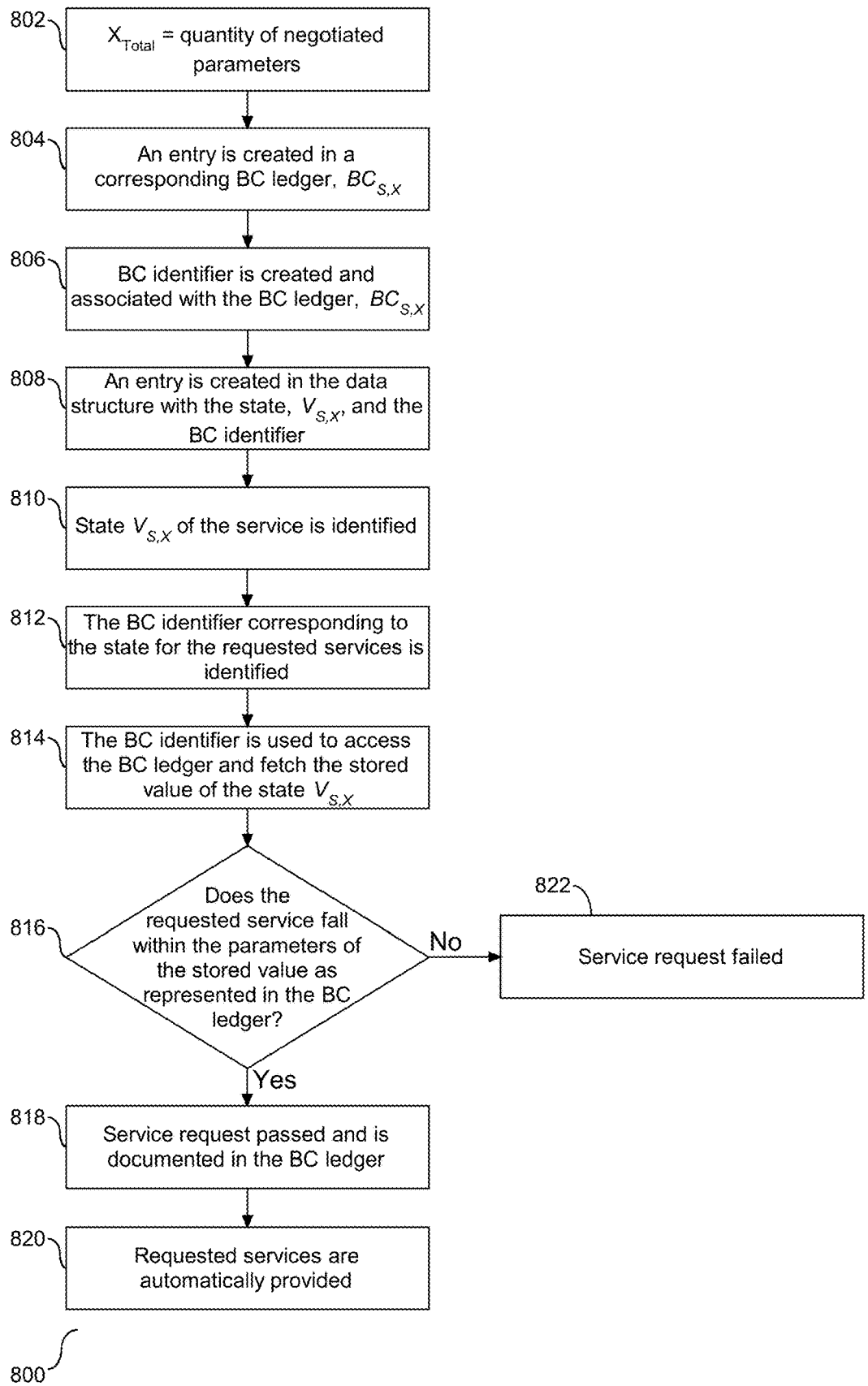
FIG. 8 depicts a flow chart illustrating employing blockchain (BC) technology to model the smart contract.

The smart contract represents an agreement comprised of multiple terms between two parties. Once the agreement is reached on a specific term, the storage of the resulting smart contract is considered. As shown and described in FIG. 1, the smart contract is preferably stored in persistent storage with a provenance service to mitigate or prevent amendment to the contract terms. One manifestation of the provenance service is blockchain technology, hereinafter "BC". The BC is leveraged into the smart contract to provide authenticity, e.g. provenance, of stored data. Referring to FIG. 8, a flow chart (800) is provided to illustrate employing BC technology to model the smart contract. As the terms of the agreement are negotiate within the automata platform, the service provider and the ends user record all steps within a BC. The variable $X_{Total}$ represents the quantity of negotiated parameters, described herein as a set of states, $V_S$, of the smart contract (802). As each state, $V_{S,X}$, is negotiated and verified, an entry is created in a corresponding or designated BC ledger, $BC_{S,X}$ (804). The BC entry stores the value of the negotiated and verified state. In addition, an identifier, referred to herein as a BC identifier, is created and associated with the BC ledger, $BC_{S,X}$ (806). In one embodiment, the BC identifier is a uniform resource identifier (URI) or other unique asset identifier. A data structure, such as a knowledge graph, is created to organize an arrangement of the set of states and corresponding BC identifiers. An entry is created in the data structure with the state, $V_{S,X}$, and the BC identifier (808). Accordingly, at the state values are negotiated, they are recorded in the BC ledger and a corresponding BC identifier is storage or otherwise associated with the state values in a corresponding data structure entry.

At such time as the end user requests a service, the state $V_{S,X}$ of the service is identified (810), and the service provider response to the request either passes or fails, which in one embodiment is documented by providing or not providing the requested service. By way of example, the BC identifier corresponding to the state for the requested service is identified (812). The BC identifier is used to access the BC ledger and fetch the stored value of the state $V_{S,X}$ (814). It is determined if the requested service falls within the parameters of the stored value as represented in the BC ledger (816). A positive response to the determination at step (816) is an indication that the service request passed and is documented in the BC ledger (818), and the requested services are automatically provided (820). There are different embodiments for the documentation. For example, in one embodiment, the service provider digitally signs the ledger, which enables the input and output actions of the interface automata to be mapped to massages and digital signatures stored within the BC. A negative response to the determination at step (816) is an indication that the service request failed, and a failure message is returned (822). The failed message is an indication that the terms of the contract have been violated, and the identity of the party responsible for the violation ascertainable by the BC ledger entry. Accordingly, the BC and corresponding BC ledger entries provides an immutable and distributed venue for storing the states of the smart contract.

Aspects of the smart contract formation and implementation as shown in FIG. 1-8, employs one or more functional tools, as shown and described in FIG. 1. Aspects of the functional tools (152)-(162) and their associated functionality may be embodied in a computer system/server in a single location, or in one embodiment, may be configured in a cloud based system sharing computing resources. With references to FIG. 9, a block diagram (900) is provided illustrating an example of a computer system/server (902), hereinafter referred to as a host (902) in a cloud computing environment (910), to implement the processes described above with respect to FIGS. 4-8. Host (902) is operational with numerous other general purpose or special purpose computing system environments or configurations. Examples of well-known computing systems, environments, and/or configurations that may be suitable for use with host (902) include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and file systems (e.g., distributed storage environments and distributed cloud computing environments) that include any of the above systems, devices, and their equivalents.

Host (902) may be described in the general context of computer system-executable instructions, such as program modules, being executed by a computer system. Generally, program modules may include routines, programs, objects, components, logic, data structures, and so on that perform particular tasks or implement particular abstract data types. Host (902) may be practiced in distributed cloud computing environments where tasks are performed by remote processing devices that are linked through a communications network. In a distributed cloud computing environment, program modules may be located in both local and remote computer system storage media including memory storage devices.

Figure 9:
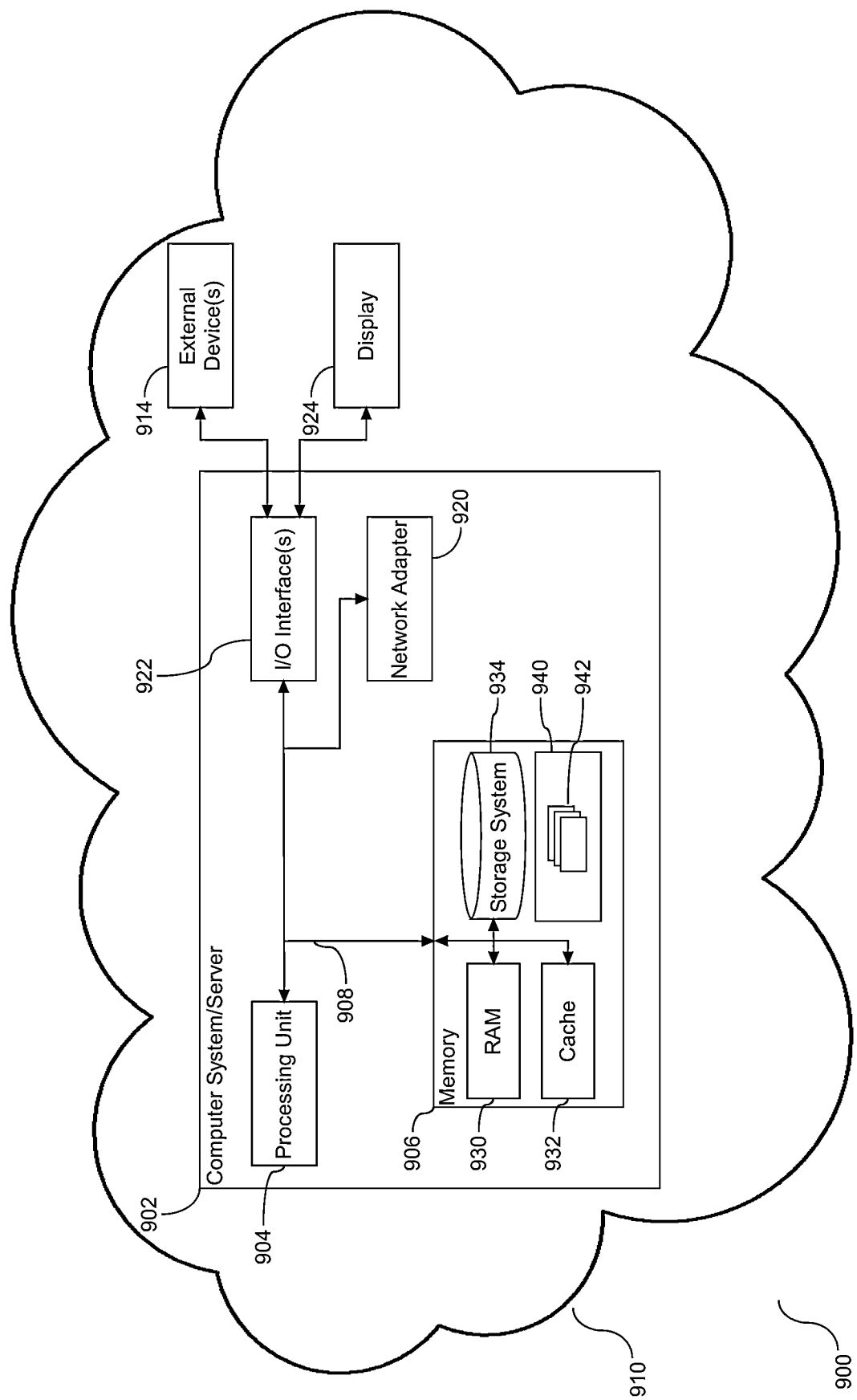
FIG. 9 depicts a block diagram illustrating an example of a computer system/server of a cloud based support system, to implement the system and processes described above with respect to FIGS. 1-8.

As shown in FIG. 9, host (902) is shown in the form of a general-purpose computing device. The components of host (902) may include, but are not limited to, one or more processors or processing units (904), e.g. hardware processors, a system memory (906), and a bus (908) that couples various system components including system memory (906) to processor (904). Bus (908) represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Host (902) typically includes a variety of computer system readable media. Such media may be any available media that is accessible by host (902) and it includes both volatile and non-volatile media, removable and non-removable media.

Memory (906) can include computer system readable media in the form of volatile memory, such as random access memory (RAM) (930) and/or cache memory (932). By way of example only, storage system (934) can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus (908) by one or more data media interfaces.

Program/utility (940), having a set (at least one) of program modules (942), may be stored in memory (906) by way of example, and not limitation, as well as an operating system, one or more application programs, other program modules, and program data. Each of the operating systems, one or more application programs, other program modules, and program data or some combination thereof, may include an implementation of a networking environment. Program modules (942) generally carry out the functions and/or methodologies of embodiments to iteratively manager seed word membership of one or more domain-specific dictionaries, and apply the managed dictionary to an unexplored corpus to identify matching data within the corpus to the seed word instances of the dictionary. For example, the set of program modules (942) may include the tools (152)-(162) as described in FIG. 1.

Host (902) may also communicate with one or more external devices (914), such as a keyboard, a pointing device, etc.; a display (924); one or more devices that enable a user to interact with host (902); and/or any devices (e.g., network card, modem, etc.) that enable host (902) to communicate with one or more other computing devices. Such communication can occur via Input/Output (I/O) interface(s) (922). Still yet, host (902) can communicate with one or more networks such as a local area network (LAN), a general wide area network (WAN), and/or a public network (e.g., the Internet) via network adapter (920). As depicted, network adapter (920) communicates with the other components of host (902) via bus (908). In one embodiment, a plurality of nodes of a distributed file system (not shown) is in communication with the host (902) via the I/O interface (922) or via the network adapter (920). It should be understood that although not shown, other hardware and/or software components could be used in conjunction with host (902). Examples, include, but are not limited to: microcode, device drivers, redundant processing units, external disk drive arrays, RAID systems, tape drives, and data archival storage systems, etc.

In this document, the terms "computer program medium," "computer usable medium," and "computer readable medium" are used to generally refer to media such as main memory (906), including RAM (930), cache (932), and storage system (934), such as a removable storage drive and a hard disk installed in a hard disk drive.

Computer programs (also called computer control logic) are stored in memory (906). Computer programs may also be received via a communication interface, such as network adapter (920). Such computer programs, when run, enable the computer system to perform the features of the present embodiments as discussed herein. In particular, the computer programs, when run, enable the processing unit (904) to perform the features of the computer system. Accordingly, such computer programs represent controllers of the computer system.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a dynamic or static random access memory (RAM), a read-only memory (ROM), an erasable programmable read-only memory (EPROM or Flash memory), a magnetic storage device, a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java®, Smalltalk®, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server or cluster of servers. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the embodiments.

In one embodiment, host (902) is a node of a cloud computing environment. As is known in the art, cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models. Example of such characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher layer of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some layer of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 10:
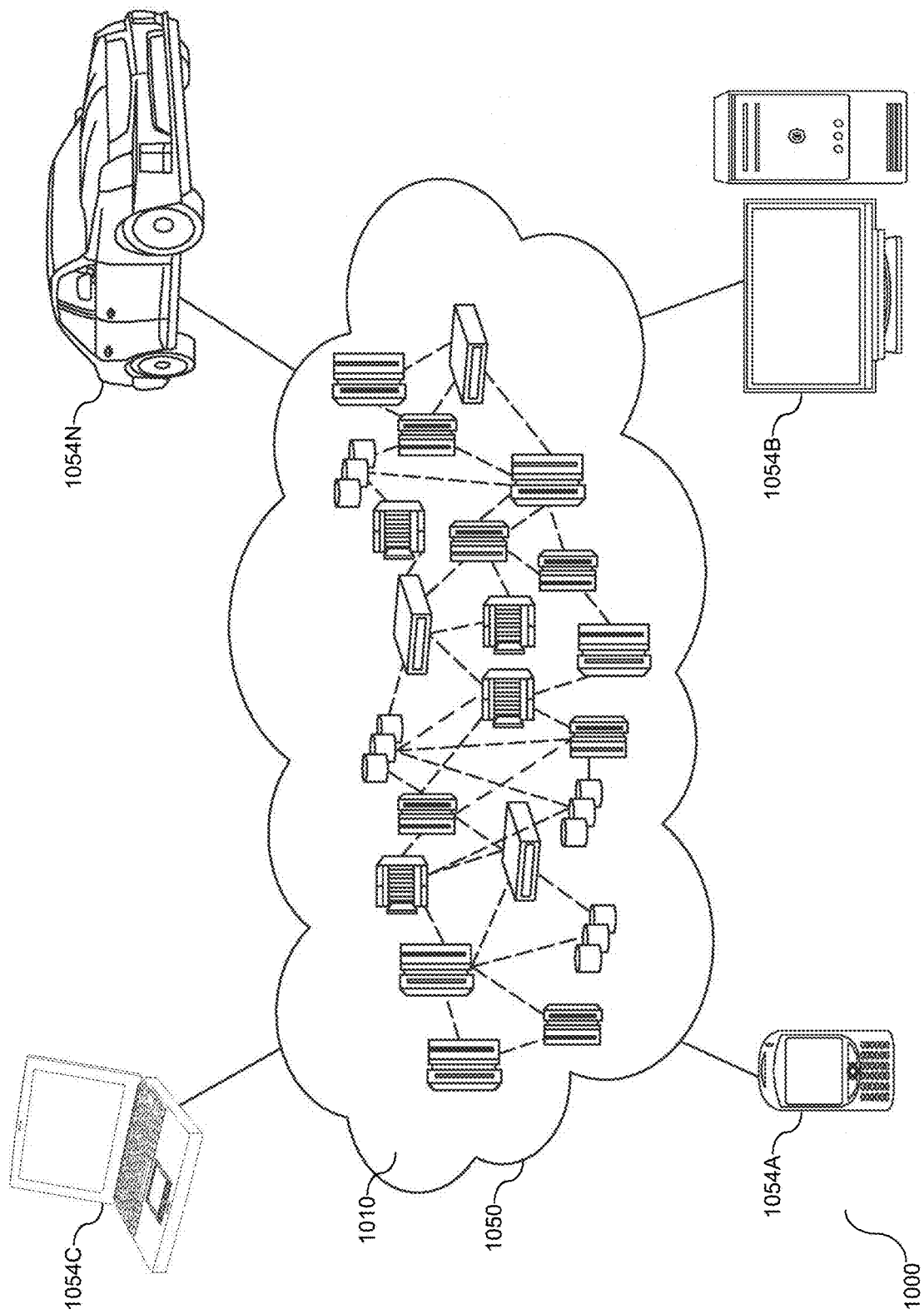
FIG. 10 depicts a block diagram illustrating a cloud computer environment.

Referring now to FIG. 10, an illustrative cloud computing network (1000). As shown, cloud computing network (1000) includes a cloud computing environment (1050) having one or more cloud computing nodes (1010) with which local computing devices used by cloud consumers may communicate. Examples of these local computing devices include, but are not limited to, personal digital assistant (PDA) or cellular telephone (1054A), desktop computer (1054B), laptop computer (1054C), and/or automobile computer system (1054N). Individual nodes within nodes (1010) may further communicate with one another. They may be grouped (not shown) physically or virtually, in one or more networks, such as Private, Community, Public, or Hybrid clouds as described hereinabove, or a combination thereof. This allows cloud computing environment (1000) to offer infrastructure, platforms and/or software as services for which a cloud consumer does not need to maintain resources on a local computing device. It is understood that the types of computing devices (1054A-N) shown in FIG. 10 are intended to be illustrative only and that the cloud computing environment (1050) can communicate with any type of computerized device over any type of network and/or network addressable connection (e.g., using a web browser).

Figure 11:
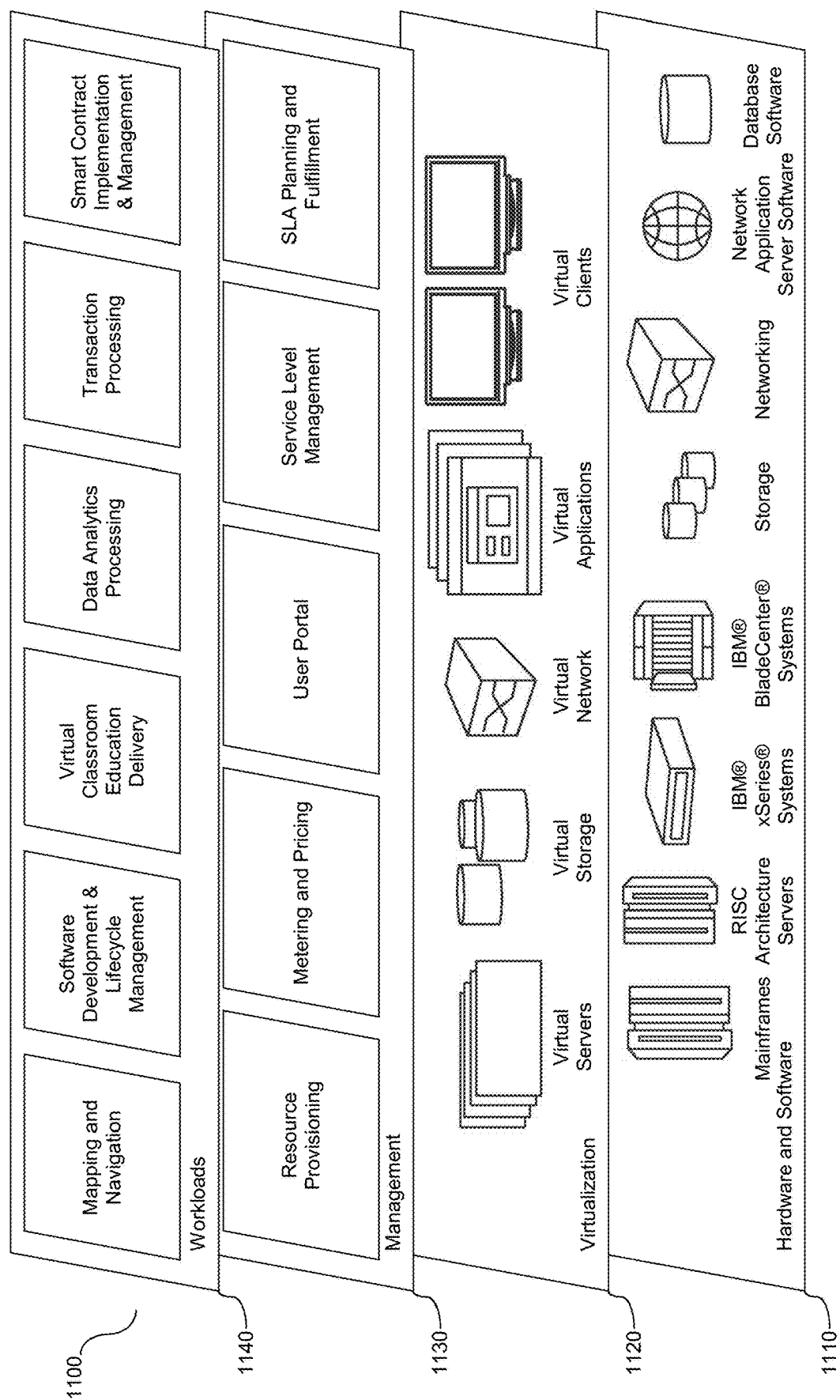
FIG. 11 depicts a block diagram illustrating a set of functional abstraction model layers provided by the cloud computing environment.

Referring now to FIG. 11, a set of functional abstraction layers (1100) provided by the cloud computing network of FIG. 10 is shown. It should be understood in advance that the components, layers, and functions shown in FIG. 11 are intended to be illustrative only, and the embodiments are not limited thereto. As depicted, the following layers and corresponding functions are provided: hardware and software layer (1110), virtualization layer (1120), management layer (1130), and workload layer (1140).

The hardware and software layer (1110) includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer (1120) provides an abstraction layer from which the following examples of virtual entities may be provided: virtual servers; virtual storage; virtual networks, including virtual private networks; virtual applications and operating systems; and virtual clients.

In one example, management layer (1130) may provide the following functions: resource provisioning, metering and pricing, user portal, service layer management, and SLA planning and fulfillment. Resource provisioning provides dynamic procurement of computing resources and other resources that are utilized to perform tasks within the cloud computing environment. Metering and pricing provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service layer management provides cloud computing resource allocation and management such that required service layers are met. Service Layer Agreement (SLA) planning and fulfillment provides pre-arrangement for, and procurement of, cloud computing resources for which a future requirement is anticipated in accordance with an SLA.

Workloads layer (1140) provides examples of functionality for which the cloud computing environment may be utilized. Examples of workloads and functions which may be provided from this layer include, but are not limited to: mapping and navigation; software development and lifecycle management; virtual classroom education delivery; data analytics processing; transaction processing; and smart contract implementation and management.

While particular embodiments of the present embodiments have been shown and described, it will be obvious to those skilled in the art that, based upon the teachings herein, changes and modifications may be made without departing from the embodiments and its broader aspects. Therefore, the appended claims are to encompass within their scope all such changes and modifications as are within the true spirit and scope of the embodiments. Furthermore, it is to be understood that the embodiments are solely defined by the appended claims. It will be understood by those with skill in the art that if a specific number of an introduced claim element is intended, such intent will be explicitly recited in the claim, and in the absence of such recitation no such limitation is present. For a non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to embodiments containing only one such element, even when the same claim includes the introductory phrases "one or more" or "at least one" and indefinite articles such as "a" or "an"; the same holds true for the use in the claims of definite articles.

The present embodiments may be a system, a method, and/or a computer program product. In addition, selected aspects of the present embodiments may take the form of an entirely hardware embodiment, an entirely software embodiment (including firmware, resident software, micro-code, etc.) or an embodiment combining software and/or hardware aspects that may all generally be referred to herein as a "circuit," "module" or "system." Furthermore, aspects of the present embodiments may take the form of computer program product embodied in a computer readable storage medium (or media) having computer readable program instructions thereon for causing a processor to carry out aspects of the present embodiments. Thus embodied, the disclosed system, a method, and/or a computer program product is operative to improve the functionality and operation of an artificial intelligence platform to expand the dictionary and apply the expanded dictionary and dictionary instances to identify matching corpus data.

Aspects of the present embodiments are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be appreciated that, although specific embodiments have been described herein for purposes of illustration, various modifications may be made without departing from the spirit and scope of the embodiments. Accordingly, the scope of protection of the embodiments is limited only by the following claims and their equivalents.

What is claimed is:
1. A computer system comprising:
a processing unit operatively coupled to memory; and
a knowledge engine in communication with the processing unit, the knowledge engine to model an agreement as a smart contract, including:

a resource manager configured to model a request for resources as a first computation model interface and capture reservation of resources in the first computation model interface;
a service manager configured to model provision of services as a second computation model interface;
a compatibility manager operatively coupled to the resource manager and the service manager, the compatibility manager configured to verify compatibility of the first computation model interface and the second computation model interface;
a synchronizer operatively coupled to the compatibility manager, the synchronizer configured to synchronize input and output actions between the first and second computation model interfaces responsive to the compatibility verification, including the synchronizer configured to compose the smart contract as a third computation model interface to model negotiation of contractual terms, including the captured reservation of resources with the provision of services; and
a recordation manager configured to record the smart contract in an operatively coupled immutable venue,
wherein the computation model interfaces have formal semantics adapted to be translated to an unambiguous mathematical representation.

2. The system of claim 1, further comprising a transaction manager configured to:
present a transaction to the third computation model interface; and
leverage a value corresponding to an entry in the immutable venue to process the transaction.

3. The system of claim 2, wherein the transaction manager is configured to validate the presented transaction, monitor the presented transaction, or detect violation of the presented transaction, wherein violation detection further comprises the transaction manager configured to leverage the immutable venue to identify a violating party of the presented transaction.

4. The system of claim 1, wherein the smart contract is a Service Level Agreement (SLA), and wherein the transaction manager is further configured to manage data migration according to the resources and services modeled in the SLA.

5. The system of claim 1, wherein a manifestation of the computation of the computation model interfaces with formal semantics comprises an automata, a finite state machine, a petri-net, data flow, message sequence chats, or a combination thereof.

6. A computer program product for modeling an agreement as a smart contract, the computer program product comprising:
a computer readable storage medium having program code embodied therewith, the program code executable by a processor to:
model a request for resources as a first computation model interface and capture reservation of resources in the first computation model interface;
model provision of services as a second computation model interface;
verify compatibility of the first computation model interface and the second computation model interface;
synchronize input and output actions between the first and second computation model interfaces responsive to the compatibility verification, including compose a smart contract as a third computation model interface to model negotiation of contractual terms, including the captured reservation of resources with the provision of services; and
record the composed smart contract in an operatively coupled immutable venue,
wherein the computation model interfaces have formal semantics adapted to be translated to an unambiguous mathematical representation.

7. The computer program product of claim 6, further comprising program code executable by the processor to present a transaction to the third computation model interface, and leverage a value corresponding to an entry in the immutable venue to process the transaction.

8. The computer program product of claim 7, further comprising program code executable by the processor to validate the presented transaction, monitor the presented transaction, or detect violation of the presented transaction, wherein violation detection further comprises program code executable by the processor to leverage the immutable venue to identify a violating party of the presented transaction.

9. The computer program product of claim 6, wherein the smart contract is a Service Level Agreement (SLA), and further comprising program code executable by the processor to manage data migration according to the resources and services modeled in the SLA.

10. The computer program product of claim 6, wherein a manifestation of the computation of the computation model interfaces with formal semantics comprises an automata, a finite state machine, a petri-net, data flow, message sequence chats, or a combination thereof.

11. A method comprising:
modeling a request for resources as a first computation model interface and capturing reservation of resources in the first computation model interface;
modeling provision of services as a second computation model interface;
verifying compatibility of the first computation model interface and the second computation model interface;
responsive to the compatibility verification, synchronizing input and output actions between the first and second computation model interfaces, the synchronization including composing a smart contract as a third computation model interface modeling negotiation of contractual terms, including the captured reservation of resources with the provision of services; and
recording the composed smart contract in an immutable venue,
wherein the computation model interfaces have formal semantics adapted to be translated to an unambiguous mathematical representation.

12. The method of claim 11, further comprising presenting a transaction to the third computation model interface, and leveraging a value corresponding to an entry in the immutable venue to process the transaction.

13. The method of claim 12, further comprising validating the presented transaction, monitoring the presented transaction, or detecting violation of the presented transaction, wherein detecting violation further comprising leveraging the immutable venue to identify a violating party of the presented transaction.

14. The method of claim 11, wherein the smart contract is a Service Level Agreement (SLA), and further comprising managing data migration according to the resources and services modeling in the SLA.

15. The method of claim 11, wherein a manifestation of the computation of the computation model interfaces with formal semantics comprises an automata, a finite state machine, a petri-net, data flow, message sequence chats, or a combination thereof.

* * * * *